US012626720B2

(12) United States Patent
Biskeborn et al.

(10) Patent No.: US 12,626,720 B2
(45) Date of Patent: May 12, 2026

(54) TAPE HEAD MODULE HAVING A CONGRUENT EXTENSION AND METHOD FOR MASS PRODUCING SAME

(71) Applicant: Western Digital Technologies, Inc., San Jose, CA (US)

(72) Inventors: Robert G. Biskeborn, Hollister, CA (US); Eduardo Torres Mireles, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/404,216

(22) Filed: Jan. 4, 2024

(65) Prior Publication Data

US 2025/0226004 A1      Jul. 10, 2025

(51) Int. Cl.
*G11B 5/592* (2006.01)
*G11B 5/008* (2006.01)
*G11B 5/29* (2006.01)

(52) U.S. Cl.
CPC ........ *G11B 5/5926* (2013.01); *G11B 5/00813* (2013.01); *G11B 5/29* (2013.01)

(58) Field of Classification Search
None
See application file for complete search history.

(56) References Cited

U.S. PATENT DOCUMENTS

| | | | | |
|---|---|---|---|---|
| 8,045,290 B2 * | 10/2011 | McKinstry | ........... | G11B 5/4976 |
| | | | | 360/77.12 |
| 9,978,411 B1 * | 5/2018 | Biskeborn | .......... | G11B 20/1201 |
| 10,269,378 B1 * | 4/2019 | Miyamura | ........... | G11B 5/4893 |
| 11,189,306 B1 * | 11/2021 | Biskeborn | .............. | G11B 5/187 |
| 11,670,329 B1 * | 6/2023 | Le | ........................... | G11B 5/02 |
| | | | | 360/121 |
| 11,817,137 B1 * | 11/2023 | Biskeborn | ............ | G11B 5/5926 |
| 12,087,336 B1 * | 9/2024 | Biskeborn | .............. | G11B 5/584 |
| 12,322,424 B2 * | 6/2025 | Biskeborn | .............. | G11B 5/588 |
| 2005/0018349 A1 * | 1/2005 | Eaton | ..................... | G11B 5/127 |
| 2005/0134989 A1 * | 6/2005 | Girvin | ............... | G11B 5/00826 |
| 2016/0232936 A1 * | 8/2016 | Poorman | ............... | G11B 15/62 |
| 2017/0365283 A1 * | 12/2017 | Biskeborn | .......... | G11B 5/00826 |
| 2022/0415355 A1 * | 12/2022 | Seagle | ..................... | G11B 5/23 |
| 2023/0419992 A1 * | 12/2023 | Biskeborn | ............ | G11B 5/4893 |
| 2025/0006223 A1 * | 1/2025 | Biskeborn | ............ | G11B 5/5526 |

* cited by examiner

*Primary Examiner* — William J Klimowicz
(74) *Attorney, Agent, or Firm* — Patterson + Sheridan, LLP

(57) ABSTRACT

The present disclosure generally relates to a tape drive comprising one or more tape head modules and a method of forming thereof. A first element array and a second element array are disposed on a first chip of a rowbar, and a third element array and a fourth element array are disposed on a second chip of the rowbar. The second element array is centered on the first chip, and the fourth element array is centered on the second chip. The rowbar is split to separate the first and second chips, and the first and second chips are re-arranged before being bonded to a u-beam. The u-beam is split to form a first tape head module and a second tape head module. The first tape head module comprises the second chip and a congruent segment of the first chip. The second tape head module comprises the first chip.

20 Claims, 14 Drawing Sheets

TAPE HEAD MODULE HAVING A CONGRUENT EXTENSION AND METHOD FOR MASS PRODUCING SAME

BACKGROUND OF THE DISCLOSURE

Field of the Disclosure

Embodiments of the present disclosure generally relate to a magnetic recording tape and a tape drive including the tape.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

Tape drives generally come in two sizes, a full-high drive and a half-high drive. Due to the smaller size of the half-high drive, the half-high drive is generally more popular than the full-high drive, as the overall footprint of the half-high-drive is smaller. The half-high drive is smaller height-wise than the full-high drive, which limits the amount of data elements and servo element pairs that can be utilized to write and read data, as there is no room for more than 32 data elements to be wired and functional. Thus, the half-high drive is only capable of writing 32 channels or data tracks of a tape at a time. The full-height drive is not subject to this limitation and thus, can support increasing the number of concurrent channels to 64 channels or higher. However, there is a need that full-height and half-height drives must both write and read the same identical 32 channel format, meaning that the tapes so written in either drive are fully interchangeable for both write append and reading operations in both drives.

Due to head design and format constraints, there is a need for a tape drive that enables that aforementioned requirements.

SUMMARY OF THE DISCLOSURE

The present disclosure generally relates to a tape drive comprising one or more tape head modules and a method of forming thereof. A first element array and a second element array are disposed on a first chip of a rowbar, and a third element array and a fourth element array are disposed on a second chip of the rowbar. The second element array is centered on the first chip, and the fourth element array is centered on the second chip. The rowbar is split to separate the first and second chips, and the first and second chips are re-arranged before being bonded to a u-beam. The u-beam is split to form a first tape head module and a second tape head module. The first tape head module comprises the second chip and a congruent segment of the first chip. The second tape head module comprises the first chip.

In one embodiment, a method of forming tape head modules comprises forming a first element array, a second element array, a third element array, and a fourth element array on a rowbar, the first and second element arrays being centered on a first chip of the rowbar and the third and fourth element arrays being centered on a second chip of the rowbar, wherein the second element array is disposed adjacent to the third element array, shifting the rowbar a distance such that the second element array is centered on the first chip and the fourth element array is centered on the second chip, wherein, upon shifting the rowbar, the second chip is shorter than the first chip, splitting the rowbar at a centerline of the rowbar to separate the first chip from the second chip, re-arranging the first chip and the second chip such that the first element array is disposed adjacent to the fourth element array, attaching the first chip and the second chip to a u-beam, and splitting the u-beam to form a first tape head module and a second tape head module.

In another embodiment, a method of forming tape head modules comprises forming a first element array and a second element array on a first chip of a rowbar, and a third element array and a fourth element array on a second chip of the rowbar, wherein: the first chip has a first end and a second end, and the second chip has a first end and a second end, the second end of the first chip being disposed adjacent to the first end of the second chip, the first and second element arrays are centered upon a central axis of the first chip, the third and fourth element arrays are centered upon a central axis of the second chip, and the first chip and the second chip are centered upon a central axis of the rowbar, shifting the rowbar a distance such that the second element array is centered upon the central axis of the first chip and the fourth element array is centered upon the central axis of the second chip, wherein, upon shifting the rowbar, the first chip has a greater length than the second chip based on the central axis of the rowbar, splitting the rowbar at the central axis of the rowbar to separate the first chip from the second chip, re-arranging the first chip and the second chip such that the first end of the first chip is disposed adjacent to the second end of the second chip, attaching the first chip and the second chip to a u-beam, and splitting the u-beam at the central axis of the rowbar to form a first tape head module and a second tape head module.

In yet another embodiment, a tape head module comprises a first chip segment, a second chip segment, the second chip segment being congruent with the first chip segment, a first element array disposed on the first chip segment, and a second element array disposed adjacent to the first element array, the second element array being centered upon a central axis of the first chip segment.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape drive comprising one or more tape head modules and a method of forming thereof. A first element array and a second element array are disposed on a first chip of a rowbar, and a third element array and a fourth element array are disposed on a second chip of the rowbar. The second element array is centered on the first chip, and the fourth element array is centered on the second chip. The rowbar is split to separate the first and second chips, and the first and second chips are re-arranged before being bonded to a u-beam. The u-beam is split to form a first tape head module and a second tape head module. The first tape head module comprises the second chip and a congruent segment of the first chip. The second tape head module comprises the first chip.

Figure 1A:
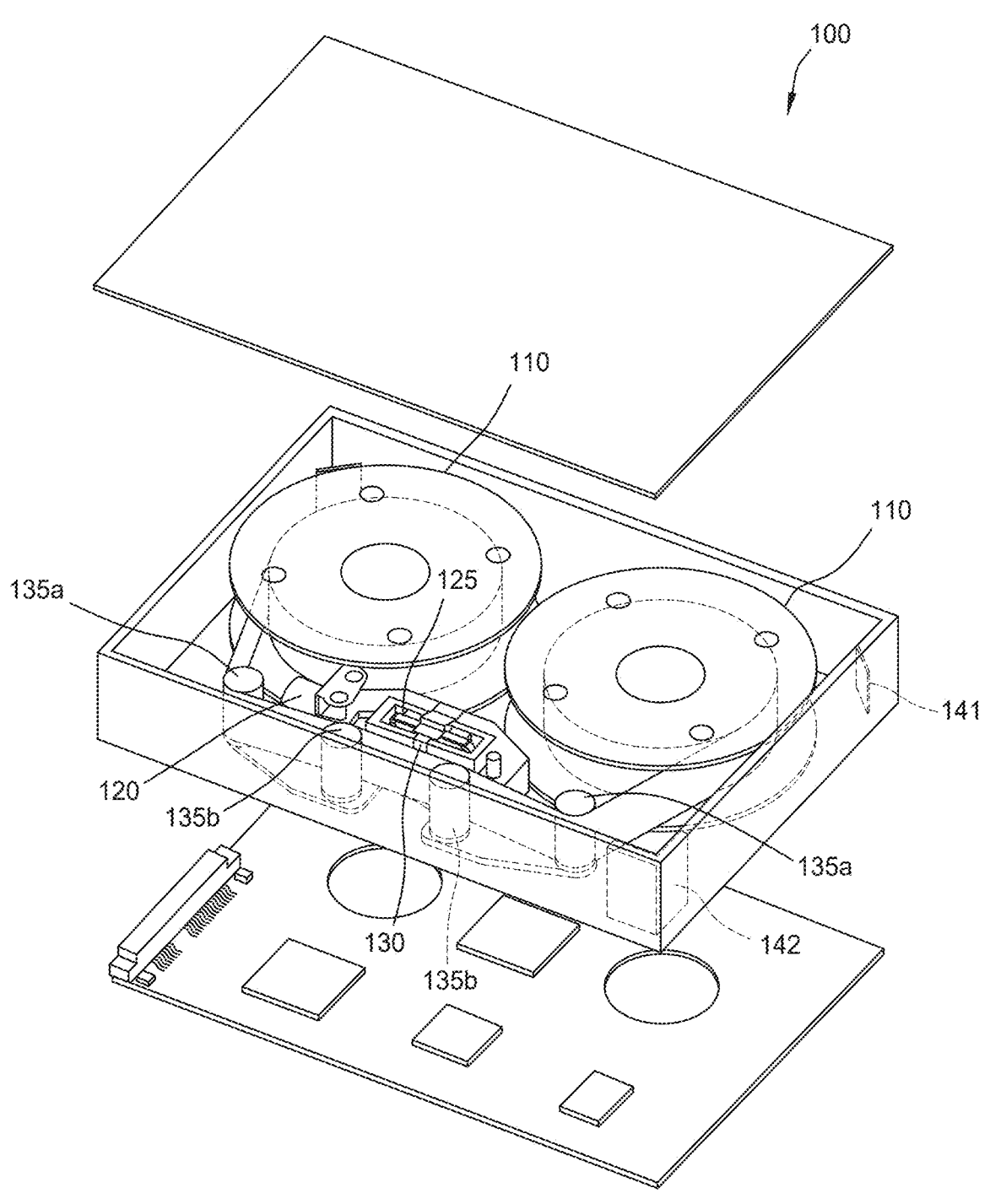
FIGS. 1A-1C illustrate a perspective exploded view, a simplified top down, and side profile view of a tape drive, in accordance with some embodiments.
Figure 1B:
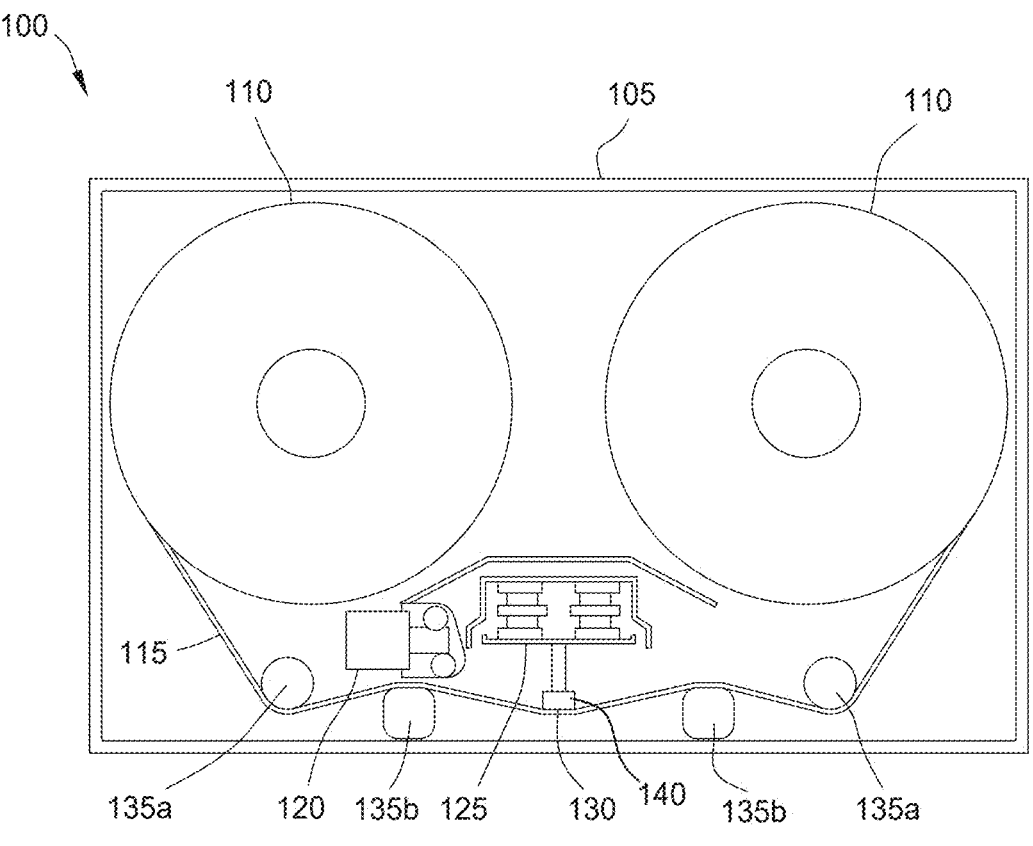
Figure 1C:
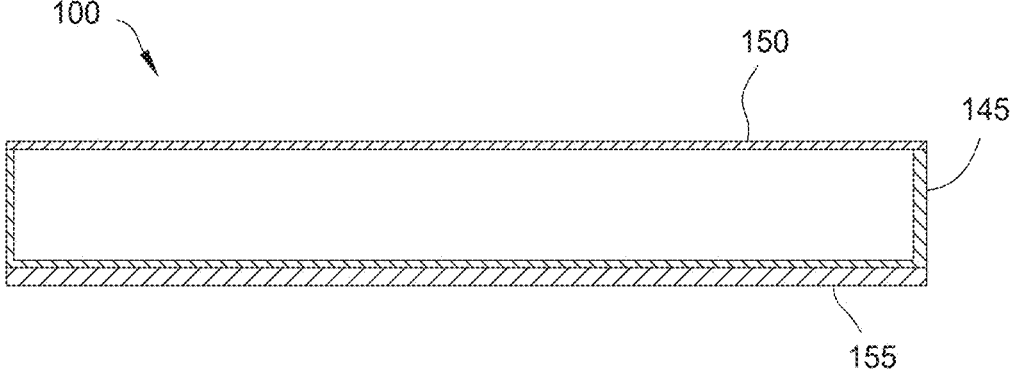

FIGS. 1A-1C illustrate a perspective exploded view, a simplified top down, and side profile view of a tape drive 100, in accordance with some embodiments. The tape drive 100 may be a captive tape drive or a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
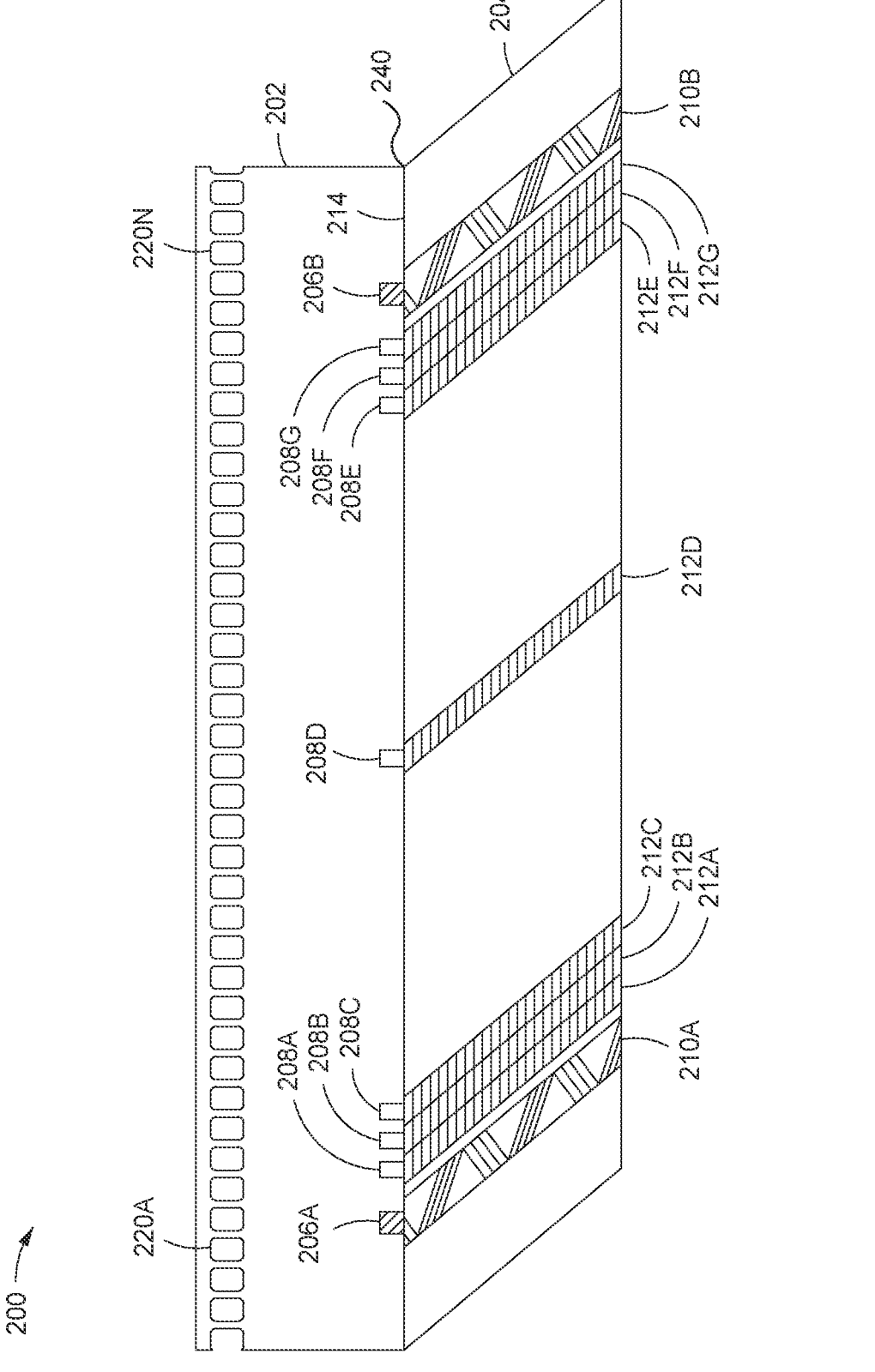
FIG. 2 is a schematic illustration of a tape head and tape that are aligned.

FIG. 2 is a schematic illustration of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204. The tape head module 200 is coupled to a controller, which may be the controller 140 of FIG. 1.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data head (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
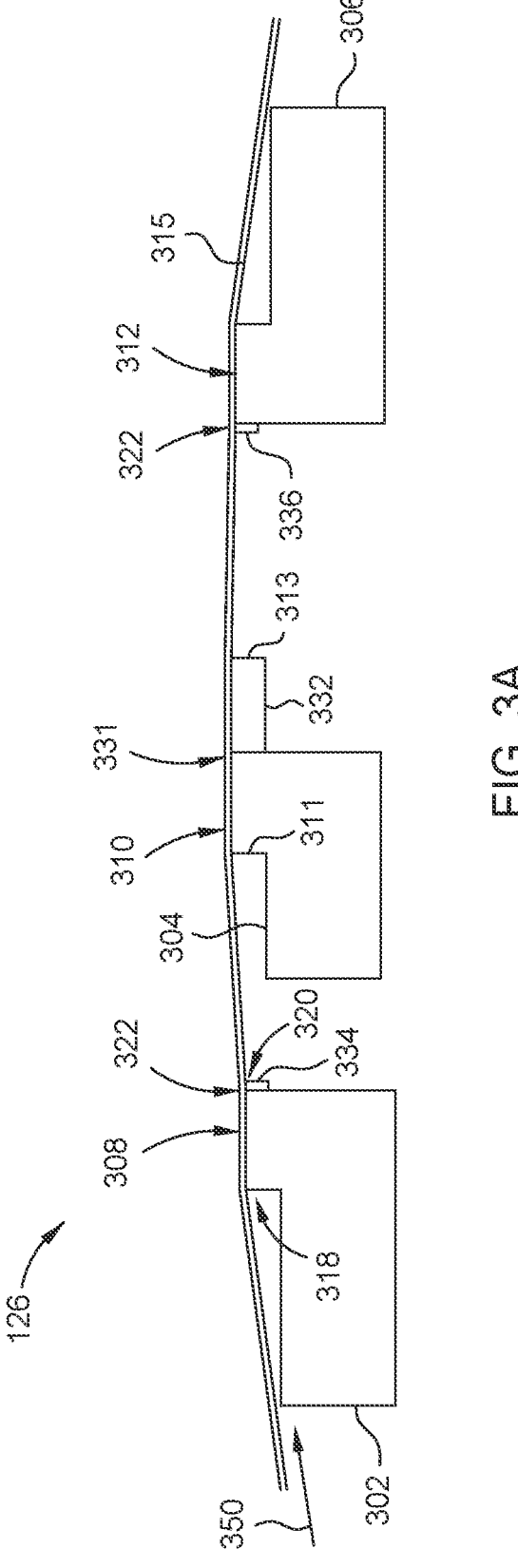
FIG. 3A illustrates a magnetic recording head according to one approach of the present disclosure that includes first, second and third modules each having a media facing surface, respectively, which may be flat, contoured, etc.
Figure 3B:
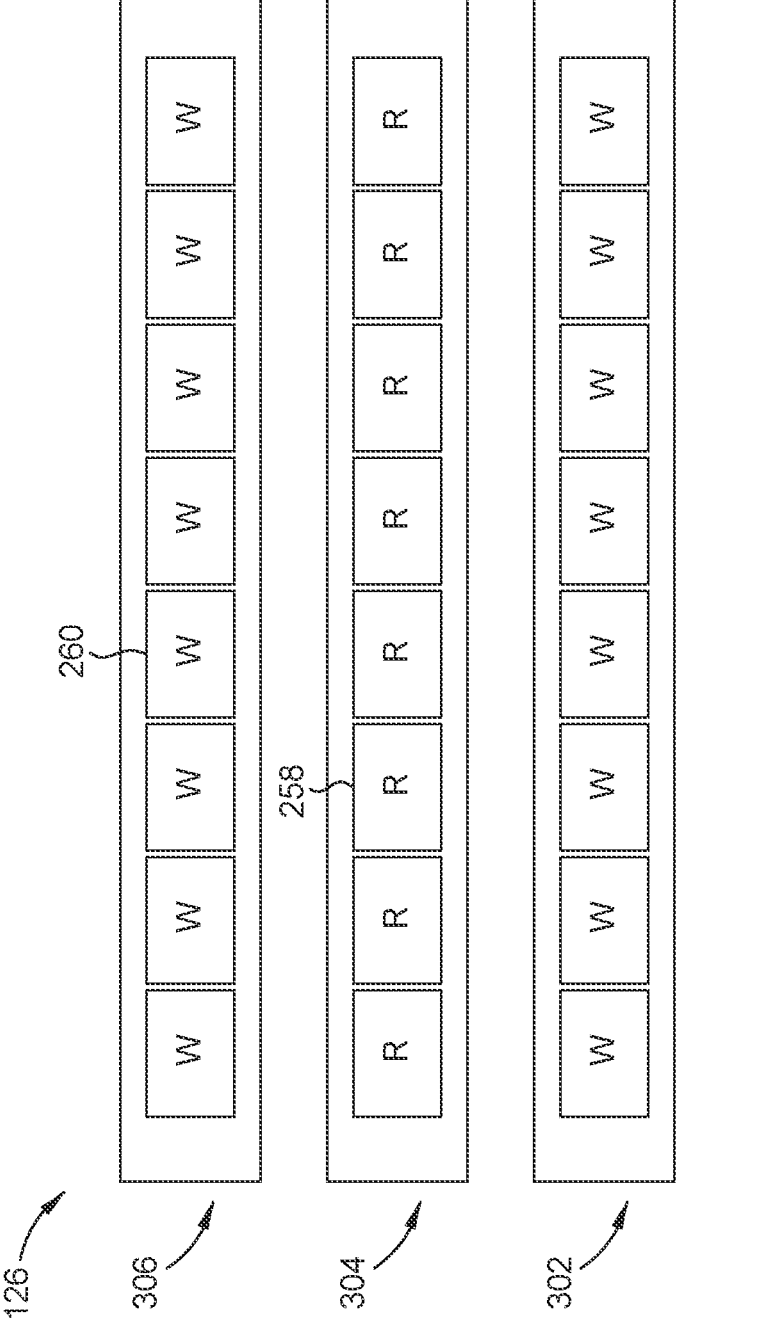
FIGS. 3B-3C illustrate various configurations for the first, second and third modules of FIG. 3A.
Figure 3C:
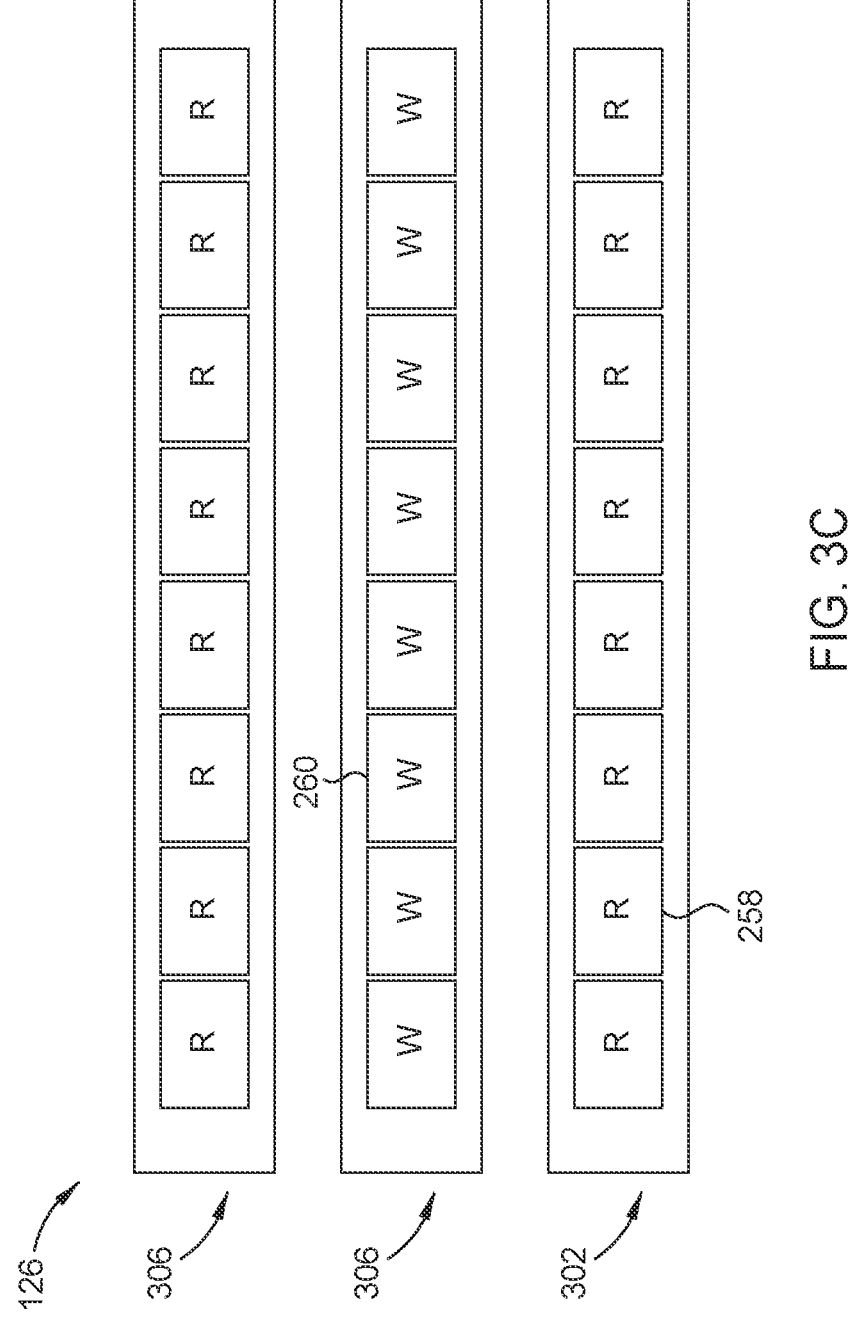

FIG. 3A illustrates a magnetic recording head 126 according to one approach of the present disclosure that includes first, second and third modules 302, 304, 306 each having a media facing surface 308, 310, 312 respectively, which may be flat, contoured, etc. FIGS. 3B-3C illustrate various configurations for the first, second and third modules 302, 304, 306 of FIG. 3A.

For explanation purposes, the first module 302, or the leading module 302, is the first module encountered by the tape 315 in a three module design for tape 315 moving in the indicated direction by arrow 350. The third module 306, or the trailing module 306, follows the middle module 304 and is the last module seen by the tape 315 in a three module design. The leading and trailing modules 302, 306 are referred to collectively as outer modules. Also note that the outer modules 302, 306 will alternate as leading modules, depending on the direction of travel of the tape 315.

In a write-read-write (W-R-W) head, outer modules for writing flank one or more inner modules for reading. FIG. 3B illustrates a W-R-W configuration, the outer modules 302, 306 each include one or more arrays of writers (W) 260. The inner module 304 of FIG. 3B includes one or more arrays of readers (R) 258 in a similar configuration. Variations of a multi-module head include a R-W-R head, like shown in FIG. 3C, a R-R-W head, a W-W-R head, etc. In yet other variations, one or more of the modules may have read/write pairs of transducers. While each module comprises 8 readers 258 or 8 writers 260, each module may include a greater number of readers 258 and/or writers 260.

Writing and reading functions are performed by different modules at any given time. In one approach, the second module 304 includes a plurality of readers (such as the readers 258 of FIGS. 3B-3C) and optional servo readers 331 and no writers. The first and third modules 302, 306 include a plurality of writers 322 and no data readers, with the exception that the outer modules 302, 306 may include optional servo readers. The writers 322 may be the writers 260 of FIGS. 3B-3C. The servo readers may be used to position the head during reading and/or writing operations. The servo reader(s) on each module are typically located towards the end of the array of readers or writers.

In one approach, the media facing surfaces 308, 310, 312 of the first, second, and third modules 302, 304, 306 lie on about parallel planes, and the media facing surface 310 of the second module 304 is above the media facing surfaces 308, 312 of the first and third modules 302, 306. Such a configuration has the effect of creating the desired wrap angle of the tape 315 relative to the media facing surface 310 of the second module 304.

Where the media facing surfaces 308, 310, 312 lie along parallel or nearly parallel yet offset planes, a vacuum created by a skiving edge 318 of the leading module 302 is sufficient to keep the tape 315 adhered to the media facing surface 308 of the leading module 302. A trailing edge 320 of the leading module 302 (the end from which the tape 315 leaves the leading module 302) is the approximate reference point which defines a wrap angle over the media facing surface 310 on the leading edge 311 of the second module 304. The tape 315 stays in close proximity to the media facing surface 308 until close to the trailing edge 320 of the leading module 302. Accordingly, the writers 322 may be located near the trailing edges of the outer modules 302, 306.

Beneficially, the inner wrap angle on the leading edge 311 of the module 304 receiving the tape 315 will be larger than the inner wrap angle on the trailing edge 313, as the tape 315 rides above the trailing module 306. This difference is generally beneficial as a smaller inner wrap angle on the trialing edge 313 tends to oppose what has heretofore been a steeper exiting effective wrap angle.

The media facing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the media facing surface 312 so there is virtually no wear on the elements when tape is moving in this direction. Particularly, the tape 315 entrains air and so will not significantly ride on the media facing surface 312 of the third module 306 (some contact may occur). This is permissible, because the leading module 302 is writing while the trailing module 306 is idle.

As shown in FIG. 3A, the first, second, and third modules 302, 304, 306 each has a closure 332, 334, 336, which extends the media facing surface of the associated module, thereby effectively positioning the read/write elements away from the edge of the media facing surface. In some aspects, the second module 304 has a closure, while the first and third modules 302, 306 do not have a closure. The closure 332 on the second module 304 can be a ceramic closure of a type typically found on tape head modules. The closures 334, 336 of the first and third modules 302, 306, however, may be shorter than the closure 332 of the second module 304 as measured parallel to a direction of tape travel over the respective module. This enables positioning the modules closer together.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some approaches is ideal for stabilizing tape motion over the second module 304.

Figure 4:
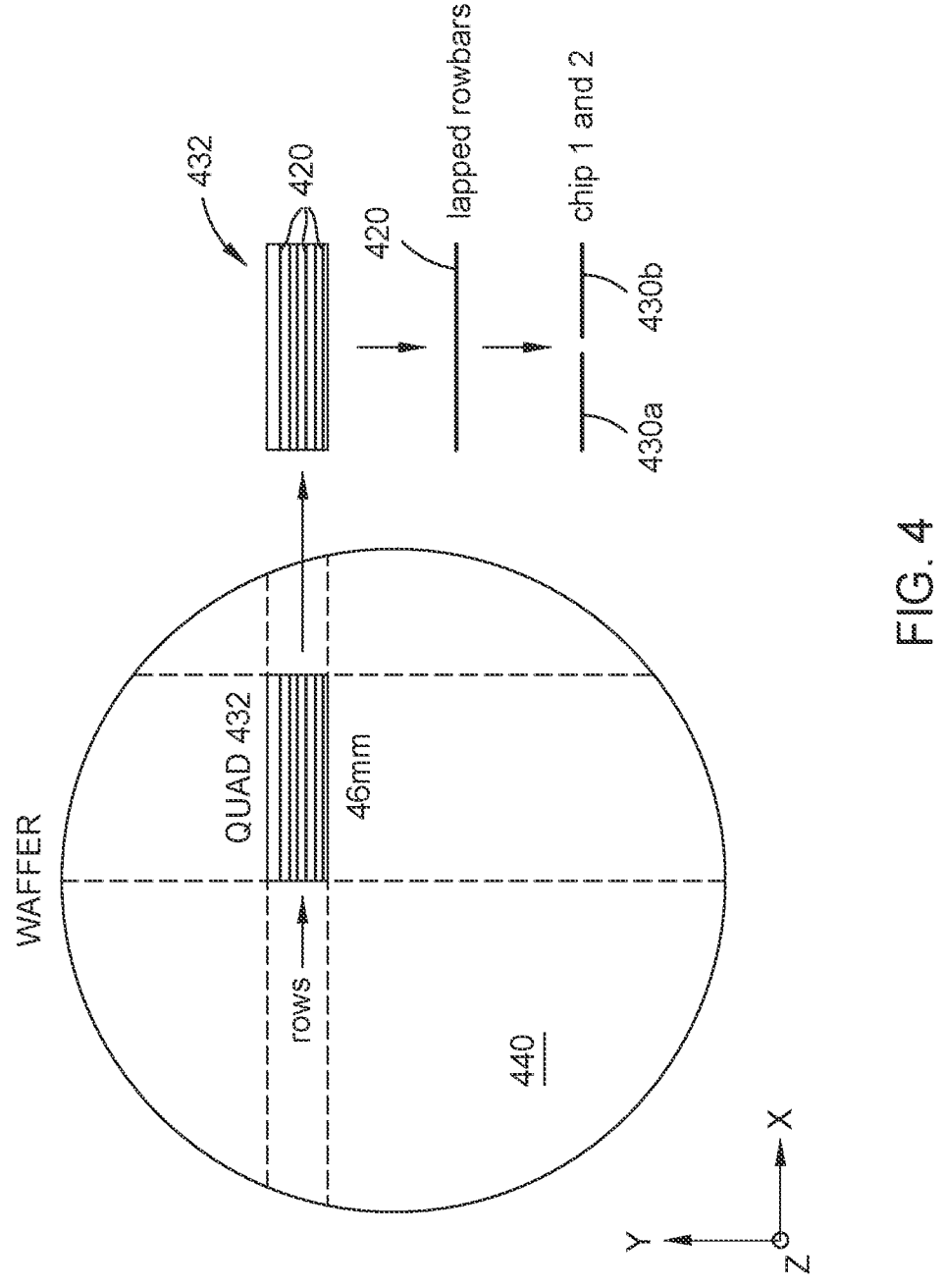
FIG. 4 illustrates a plan view of how chips of tape head modules are formed, according to one embodiment.

FIG. 4 illustrates a plan view of how chips 430a, 430b of tape head modules are formed, according to one embodiment. Each tape head module comprises a plurality of write elements, a plurality of read elements, and/or one or more servo element pairs, as discussed above in FIG. 2. Each tape head module may be the tape head module 200 of FIG. 2.

A plurality of tape head chips 430a, 430b are built on a wafer 440. The wafer 440 is organized into a plurality of quadrants or quads 432. Each quad 432 has a width in the x-direction of about 46 mm. Each quad 432 is then further divided into a plurality of rowbars 420, such as about 17 rowbars 420. Each rowbar 420 is eventually divided into two chips 430a, 430b. Each chip 430a, 430b has a width in the x-direction of about 22.5 mm. A plurality of pads is then formed on each chip 430a, 430b, and a plurality of data elements is formed on each chip 430a, 430b, where each data element is connected to two pads. Servo elements are also formed on each chip 430a, 430b. Each chip 430a, 430b comprises 64 to 66 data elements and one or more pairs of servo elements, where the data elements and servo elements of each chip 430a, 430b are formed concurrently. The data elements may be write elements or read elements.

FIGS. 5A-5G illustrate a method of forming tape head modules 500a, 500b, according to one embodiment. Each tape head module comprises a plurality of write elements, a plurality of read elements, and/or one or more servo element pairs, as discussed above in FIG. 2. Each tape head module 500a, 500b may be utilized with, or be a part of, the tape head module 200 of FIG. 2. Each tape head module 500a, 500b may be utilized with, or be a part of, the magnetic recording head 126 of FIG. 3A.

The method of forming tape head modules 500a, 500b of FIGS. 5A-5G can be used to turn rowbars for full-high tape drives (i.e., 64 channels) into half-high tape drives (i.e., 32 channels). While two tape head modules are shown in FIGS. 5A-5G, a magnetic recording head, such as the magnetic recording head 126 of FIG. 3A, may comprise two or more tape head modules arranged in any write and read configuration, such as discussed above in FIGS. 3A-3C. The method of FIGS. 5A-5G may be used in combination with the method of FIG. 4.

Figure 5A:
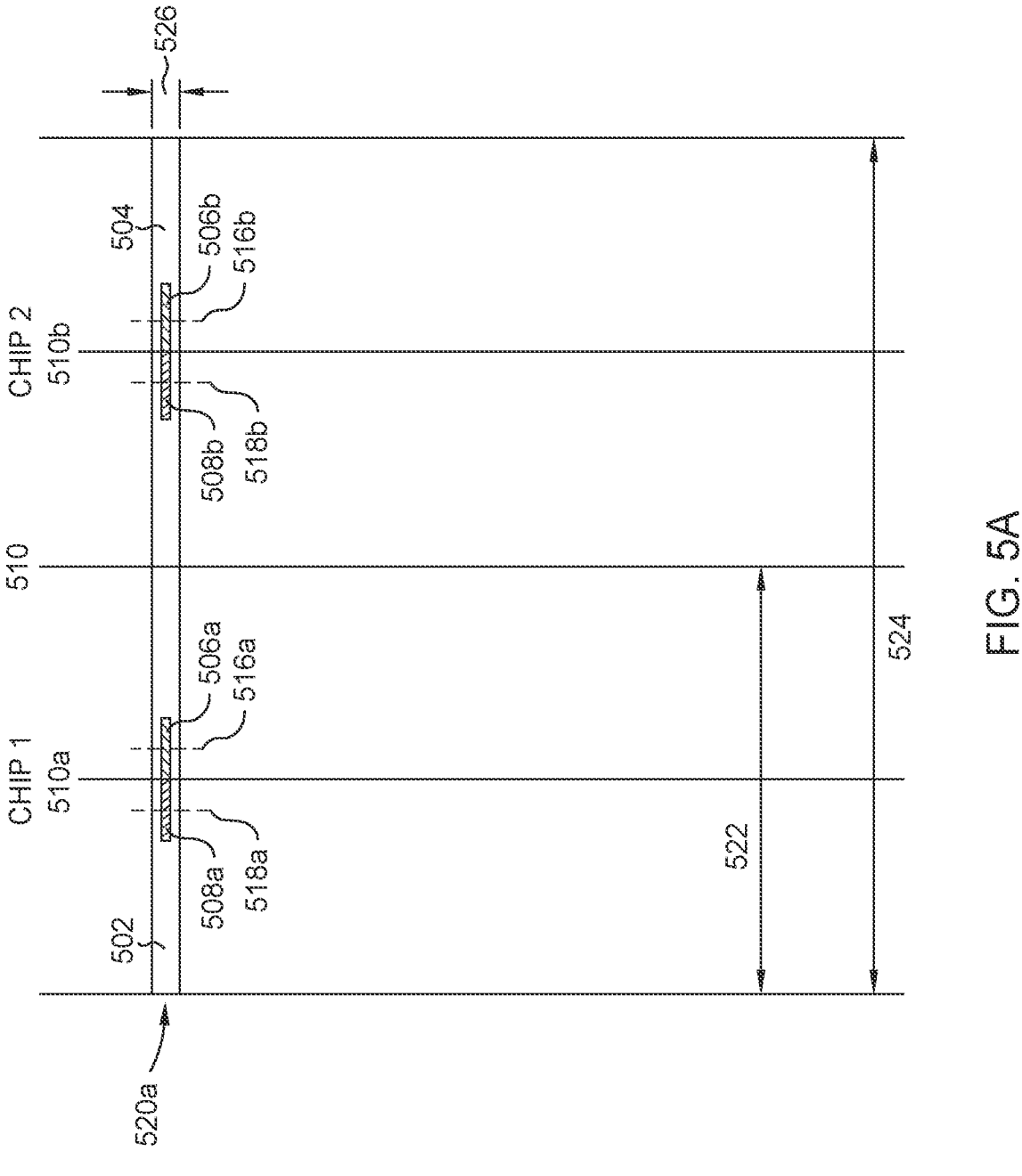
FIGS. 5A-5G illustrate a method of forming tape head modules, according to one embodiment.

FIG. 5A illustrates a first chip 502 and a second chip 504 of a rowbar 520*a*. The rowbar 520*a* may be the rowbar 420 of FIG. 4. The rowbar 520*a* has a length 524 in the x-direction of about 46 mm, and each chip 502, 504 has a length 522 in the x-direction of about 22.5 mm. The rowbar 520*a* has a width 526 in the y-direction of about 555 μm. The chips 502, 504 are centered on the rowbar 520*a* along a centerline 510. The first chip 502 comprises a first element array 506*a* and a second element array 508*a*, and the second chip 504 comprises a third element array 506*b* and a fourth element array 508*b*. Each element array 506*a*, 506*b*, 508*a*, 508*b* comprises a plurality of data elements, such as write elements, read elements, and/or servo elements. In some embodiments, each element array 506*a*, 506*b*, 508*a*, 508*b* comprises at least 32 write and/or read elements and one or more servo elements or pairs of servo elements. Thus, each chip 502, 504 may comprise 64-66 write and/or read elements and one or more servo elements.

While not shown, each data element of each element array 506*a*, 508*a*, 506*b*, 508*b* is coupled to a plurality of pads. The pads of each element array may be shifted, such as to ensure proper wiring space in half-high drives. Examples of a tape head module having shifted pads may be found in co-pending patent application titled "Tape Heads Having Shifted Array/Pad Arrangements," U.S. application Ser. No. 18/370,273, filed Sep. 19, 2023, now U.S. Pat. No. 12,087, 336, assigned to the same assignee of this application, which is herein incorporated by reference.

The first and second element arrays 506*a*, 508*a* are centered upon the first chip 502 such that a centerline 510*a* of the first chip 502 is disposed between the first and second element arrays 506*a*, 508*a*, and the third and fourth element arrays 506*b*, 508*b* are centered upon the second chip 504 such that a centerline 510*b* of the second chip 504 is disposed between the third and fourth element arrays 506*b*, 508*b*. However, the first and second chips 502, 504 being centered upon the centerlines 510*a*, 510*b*, respectively, prevent the chips 502, 504 from being used in a half-high drive (e.g., where 32 write and/or read elements are wired and operable).

FIGS. 5B-5G illustrate rowbar shifting arrangements in a series of progression. In each figure, rowbar 520*a* at the top illustrates a non-shifted rowbar as a point of reference. Rowbars below the top rowbar 520*a* of each figure (starting with rowbar 520*b*) progressively show the fabrication steps, retaining the rowbars from the prior figures to illustrate the progress. In addition, dotted centerlines 516*a*, 516*b*, 518*a*, 518*b* show the respective centerlines of element arrays 506*a*, 506*b*, 508*a*, 508*b*. When a dotted centerline for an element array aligns with a rowbar centerline 510*a* or 510*b*, it is not shown (e.g., in FIG. 5B, centerlines 516*a* and 516*b* are not shown due to overlap with centerlines 510*a* and 510*b*, respectively). Rowbars 520*a*-520*c* are the same rowbar.

Figure 5B:
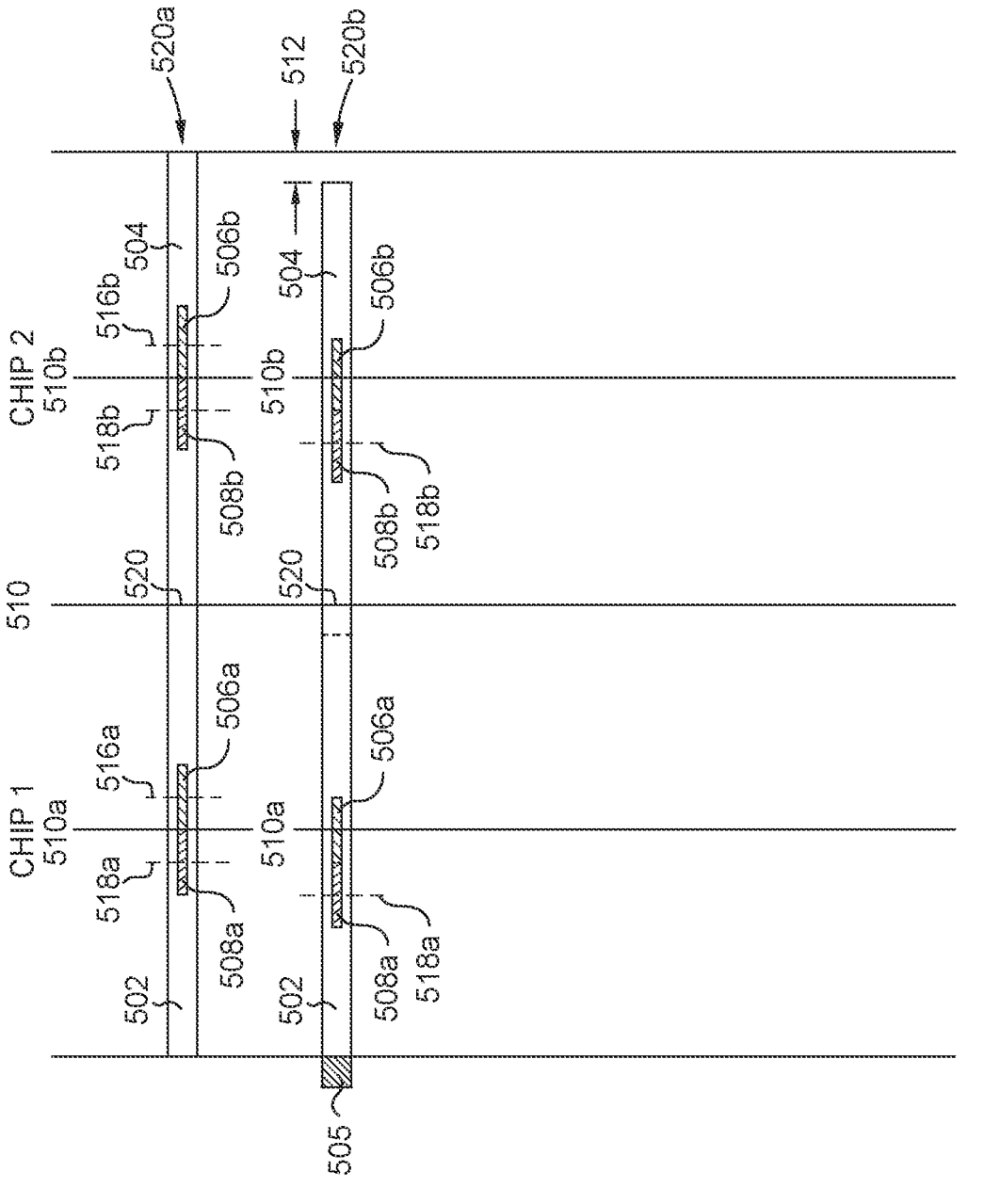

FIG. 5B illustrates shifting the rowbar position from rowbar 520*a* to rowbar 520*b*, such that the first element array 506*a* (having a centerline 516*a*) is centered on the centerline 510*a* of the first chip 502, and the third element array 506*b* (having a centerline 516*b*) is centered on the centerline 510*b* of the second chip 504. Centering the first element array 506*a* and the third element array 506*b* with the centerline of the respective chip enables the chips 502, 504 to individually be used in a half-high drive or a full-high drive (e.g., where all write and/or read elements are wired and operable). The rowbar 520*b* is shifted in the −x-direction a distance 512 of about 1.4 mm, or about one-half the length of one element array.

Due to the shifting of the rowbar 520*b* and the fabrication process, the second chip 504 is too short in the x-direction by the amount of the distance 512, and the first chip 502 is too long. One potential solution is to cut the excess portion 505 of the first chip 502, and adhere the excess portion 505 to the second chip 504 to elongate the second chip 504 to the proper length. However, several rowbars are typically fabricated at the same time, and would each be cut first, prior to adhering the cut portions to the second chip 504. The various cut excess portions 505 from each rowbar 520*b* would vary in thickness and/or width. As such, it is unlikely that the excess portion 505 from one rowbar 520*b* would fit the length difference in the second chip 504 of another rowbar 520*b*. Thus, another solution is needed, which is described below in FIGS. 5C-5G.

Figure 5C:
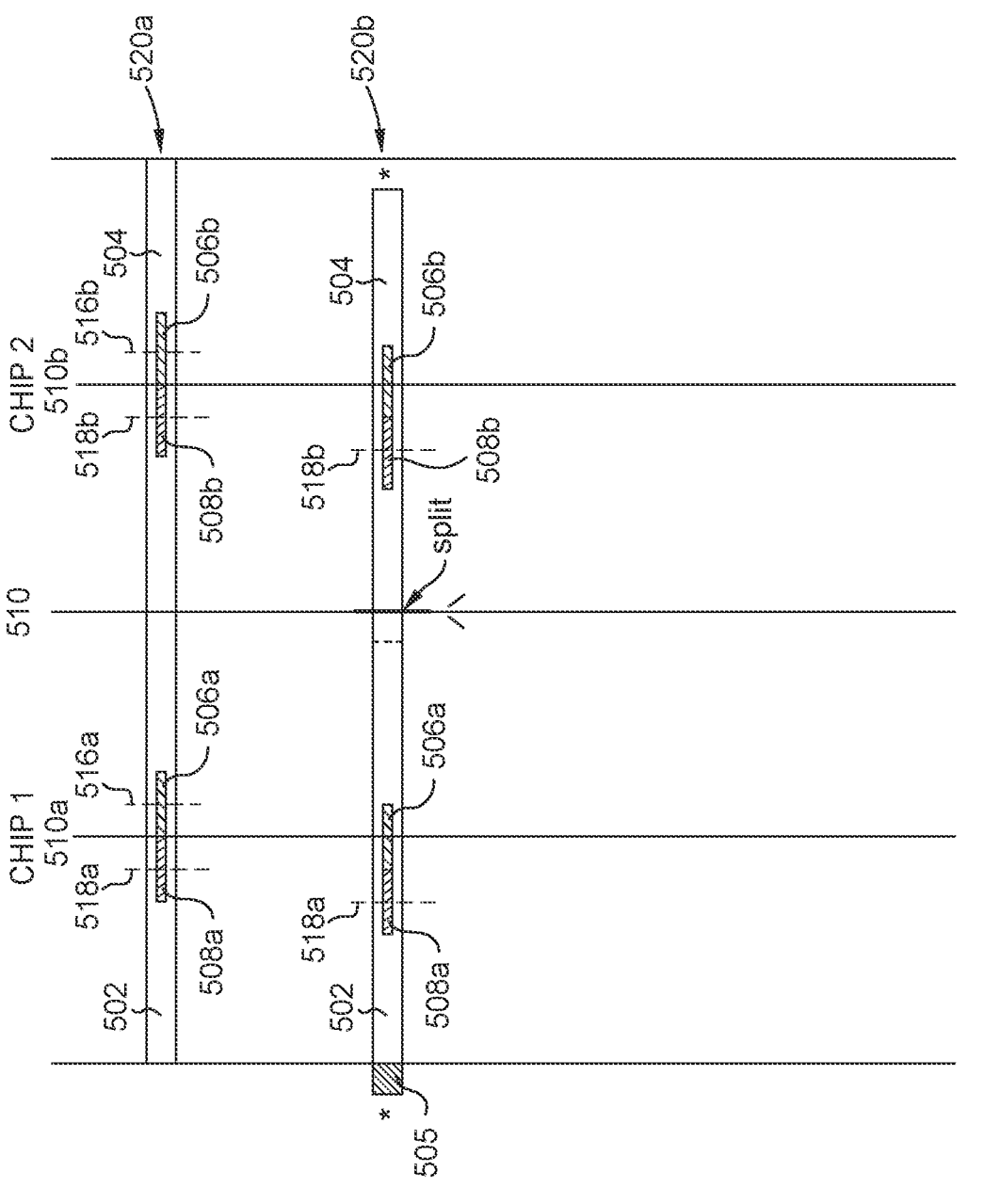
Figure 5D:
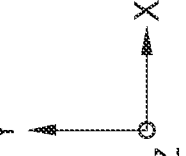

As shown in FIG. 5C, the shifted rowbar 520*b* is cut or split at the centerline 510 to separate the first chip 502 from the second chip 504. In FIG. 5D, the first and second chips 502, 504 are switched or rearranged such that an end 501 of the first chip 502 disposed adjacent to the second element array 508*a* is now disposed adjacent to an end 503 of the second chip 504 disposed adjacent to the third element array 506*b*. Prior to switching the first and second chips 502, 504, the end 501 of the first chip 502 was on an opposite side of the rowbar 520*c* from the end 503 of the second chip 504. The first and second chips 502, 504 may be adhered together after being rearranged to reform the rowbar 520*c*. The first element array 506*a* is still centered upon a centerline 510*a* of the first chip 502, and the third element array 506*b* is still centered upon a centerline 510*b* of the second chip 504.

Upon switching or re-arranging the first and second chips 502, 504, the longer first chip 502 compensates for the shorter second chip 504, as the excess portion 505 of the first chip 502 extends over the centerline 510 of the rowbar 520*c*. The excess portion 505 of the first chip 502 is congruent with the second chip 504. Because the first and second chips 502, 504 are part of the same rowbar 520*c*, the excess portion 505 has the same thickness as the second chip 504, and a same length in the x-direction as the amount of the shifted distance 512.

Figure 5E:
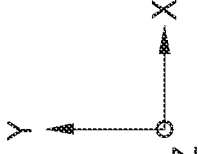

In FIG. 5E, the rearranged rowbar 520*c* is bonded to a u-beam 516. The u-beam 516 may be two u-beams joined together, one long u-beam, or pre-cut. The u-beam 516 has a same length in the x-direction as the rowbar 520*c*.

Figure 5F:
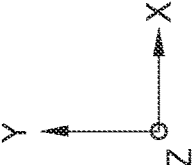
Figure 5G:
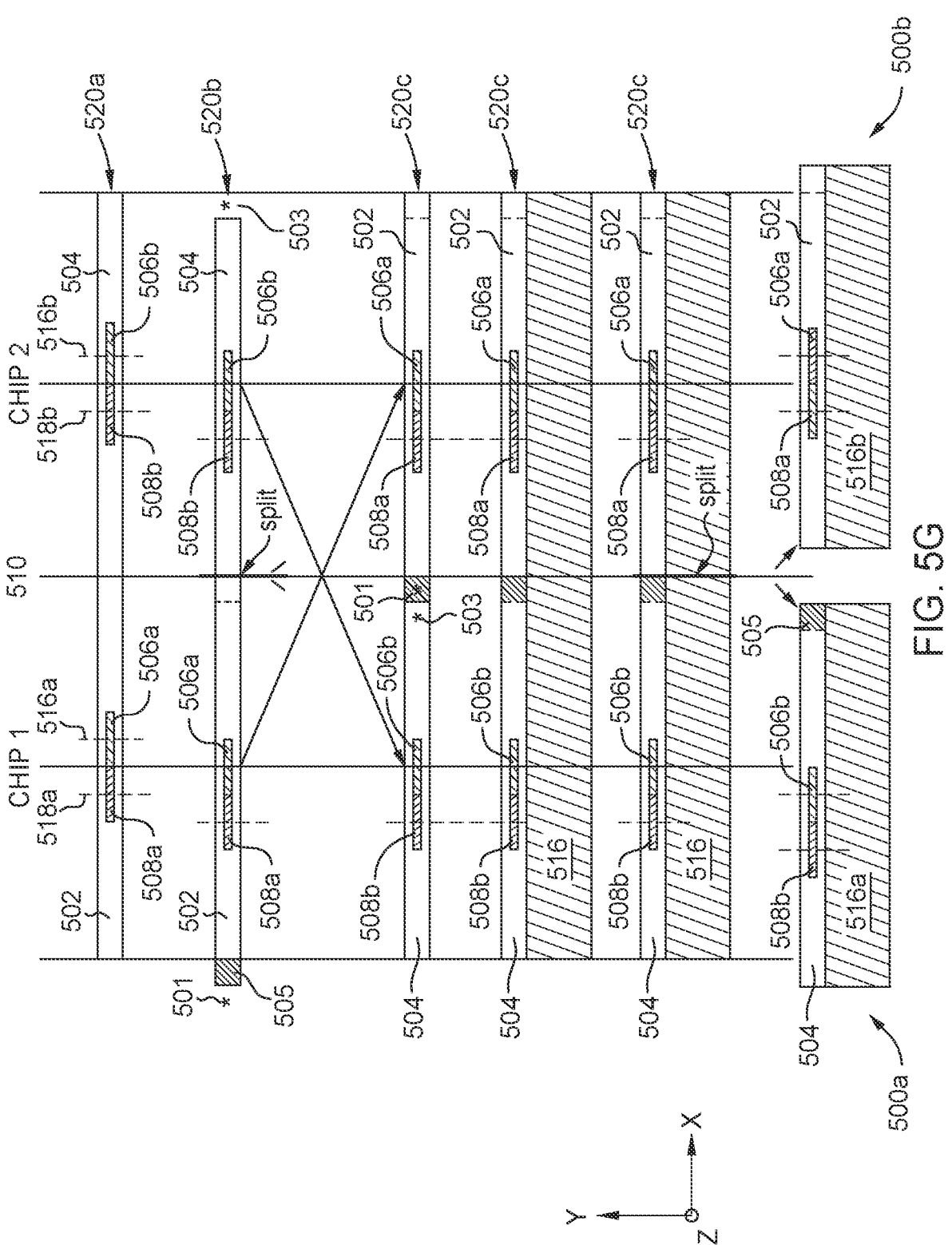

As shown in FIGS. 5F and 5G, the rowbar 520*c* and the u-beam 516 are cut along the centerline 510 of the rowbar 520*c* and split apart to form a first module 500*a* and a second module 500*b*. The first module 500*a* comprises the second chip 504 having the third element array 506*b* centered, as well as the excess portion 505 of the first chip 502. In other words, the first module 500*a* comprises a second chip 504 and a segment 505 of the first chip 502, where the segment 505 of the first chip 502 has a smaller length than the second chip 504. The second module 500*b* comprises the first chip 502 having the first element array 506*a* centered. The first and second modules 500*a*, 500*b* may each individually be used in a half-high drive or a full-high drive.

By using the above-described method to form two modules, each module having a centered element array, the manufacturing costs are reduced while increasing production output, and a full-high drive rowbar can be used to form half-high drives. Furthermore, the modules may be utilized in both full-high drives and half-high drives, eliminating the need for separate fabrication processes.

In one embodiment, a method of forming tape head modules comprises forming a first element array, a second element array, a third element array, and a fourth element array on a rowbar, the first and second element arrays being centered on a first chip of the rowbar and the third and fourth element arrays being centered on a second chip of the rowbar, wherein the second element array is disposed adjacent to the third element array, shifting the rowbar a distance such that the second element array is centered on the first chip and the fourth element array is centered on the second chip, wherein, upon shifting the rowbar, the second chip is shorter than the first chip, splitting the rowbar at a centerline of the rowbar to separate the first chip from the second chip, re-arranging the first chip and the second chip such that the first element array is disposed adjacent to the fourth element array, attaching the first chip and the second chip to a u-beam, and splitting the u-beam to form a first tape head module and a second tape head module.

The second element array is centered on the first chip and the fourth element array is centered on the second chip upon re-arranging the first chip and the second chip. Upon re-arranging the first chip and the second chip, an excess portion of the first chip is congruent with the second chip. The excess portion compensates for the shorter length of the second chip such that the first chip without the excess portion and the second chip with the excess portion have a substantially same length. The first chip without the excess portion and the second chip with the excess portion each has a length of about 22.5 mm. The first, second, third, and fourth element arrays each individually comprises at least 32 write heads or at least 32 read heads and one or more servo elements. A tape drive comprises one or more of the first tape head module and the second tape head module formed by the method.

In another embodiment, a method of forming tape head modules comprises forming a first element array and a second element array on a first chip of a rowbar, and a third element array and a fourth element array on a second chip of the rowbar, wherein: the first chip has a first end and a second end, and the second chip has a first end and a second end, the second end of the first chip being disposed adjacent to the first end of the second chip, the first and second element arrays are centered upon a central axis of the first chip, the third and fourth element arrays are centered upon a central axis of the second chip, and the first chip and the second chip are centered upon a central axis of the rowbar, shifting the rowbar a distance such that the second element array is centered upon the central axis of the first chip and the fourth element array is centered upon the central axis of the second chip, wherein, upon shifting the rowbar, the first chip has a greater length than the second chip based on the central axis of the rowbar, splitting the rowbar at the central axis of the rowbar to separate the first chip from the second chip, re-arranging the first chip and the second chip such that the first end of the first chip is disposed adjacent to the second end of the second chip, attaching the first chip and the second chip to a u-beam, and splitting the u-beam at the central axis of the rowbar to form a first tape head module and a second tape head module.

Upon re-arranging the first chip and the second chip, an excess portion of the first chip is congruent with the second chip. The first tape head module comprises the first chip without the excess portion, and the second tape head module comprises the second chip and the excess portion. The second element array is centered on the first tape head module and the fourth element array is centered on the second tape head module. The distance the rowbar is shifted is about one-half a length of the first element array. The first, second, third, and fourth element arrays each individually comprises at least 32 write heads or at least 32 read heads and one or more servo elements. A tape drive comprises one or more of the first tape head module and the second tape head module formed by the method.

In yet another embodiment, a tape head module comprises a first chip segment, a second chip segment, the second chip segment being congruent with the first chip segment, a first element array disposed on the first chip segment, and a second element array disposed adjacent to the first element array, the second element array being centered upon a central axis of the first chip segment.

The first chip segment has a greater length than the second chip segment. The first chip segment and the second chip segment were formed from a same rowbar. The first and second element arrays each individually comprises one or more servo elements and at least 32 write heads or at least 32 read heads. The tape head further comprises a u-beam, wherein the first and second chip segments and the first and second element arrays are disposed on the u-beam. The first chip segment and the second chip segment are joined together in a data element direction. The second chip segment has a shorter length than the first chip segment, and the second chip segment has a length substantially equal to a distance the first element array and the second element array are shifted from a centerline of the tape head module. A tape drive comprises the tape head module.

While the foregoing is directed to embodiments of the present disclosure, other and further embodiments of the disclosure may be devised without departing from the basic scope thereof, and the scope thereof is determined by the claims that follow.

What is claimed is:

1. A tape drive comprising one or more of a first tape head module and a second tape head module formed by a method of:

forming a first element array, a second element array, a third element array, and a fourth element array on a rowbar, the first and second element arrays being centered on a first chip of the rowbar and the third and fourth element arrays being centered on a second chip of the rowbar, wherein the second element array is disposed adjacent to the third element array;

shifting the rowbar a distance such that the second element array is centered on the first chip and the fourth element array is centered on the second chip, wherein, upon shifting the rowbar, the second chip is shorter than the first chip, the first element array is off-center on the first chip, and the third element array is off-center on the second chip;

splitting the rowbar at a centerline of the rowbar to separate the first chip from the second chip;

re-arranging the first chip and the second chip such that the first element array is disposed adjacent to the fourth element array;

attaching the first chip and the second chip to a u-beam; and splitting the u-beam to form the first tape head module and the second tape head module.

2. A tape drive comprising one or more of a first tape head module and a second tape head module formed by a method of:

forming a first element array and a second element array on a first chip of a rowbar, and a third element array and a fourth element array on a second chip of the rowbar, wherein:

the first chip has a first end and a second end, and the second chip has a first end and a second end, the second end of the first chip being disposed adjacent to the first end of the second chip, the first and second element arrays are centered upon a central axis of the first chip, the third and fourth element arrays are centered upon a central axis of the second chip, and the first chip and the second chip are centered upon a central axis of the rowbar;

shifting the rowbar a distance such that the second element array is centered upon the central axis of the first chip and the fourth element array is centered upon the central axis of the second chip, wherein, upon shifting the rowbar, the first chip has a greater length than the second chip based on the central axis of the rowbar, the first element array is off-center from the central axis of the first chip, and the third element array is off-center from the central axis of the second chip;

splitting the rowbar at the central axis of the rowbar to separate the first chip from the second chip;

re-arranging the first chip and the second chip such that the first end of the first chip is disposed adjacent to the second end of the second chip;

attaching the first chip and the second chip to a u-beam; and splitting the u-beam at the central axis of the rowbar to form the first tape head module and the second tape head module.

3. A tape head module, comprising:

a first chip segment;

a second chip segment, the second chip segment being congruent with the first chip segment;

a first element array disposed on the first chip segment; and a second element array disposed adjacent to the first element array, the second element array being centered upon a central axis of the first chip segment, wherein the second chip segment has a shorter length than the first chip segment, and wherein the second chip segment has a length substantially equal to a distance the first element array and the second element array are shifted from a centerline of the tape head module.

4. The tape head module of claim 3, wherein the first chip segment and the second chip segment were formed from a same rowbar.

5. The tape head module of claim 3, wherein the first and second element arrays each individually comprises one or more servo elements and at least 32 write heads or at least 32 read heads.

6. The tape head module of claim 3, further comprising a u-beam, wherein the first and second chip segments and the first and second element arrays are disposed on the u-beam.

7. The tape head module of claim 3, wherein the first chip segment and the second chip segment are joined together in a data element direction.

8. A tape drive comprising the tape head module of claim 3.

9. The tape head module of claim 3, wherein the first element array is off-center from the central axis of the first chip segment.

10. The tape head module of claim 3, further comprising:

a third element array disposed on the second chip segment; and a fourth element array disposed on the second chip segment.

11. The tape head module of claim 10, wherein one of the third element array or the fourth element array is off-center from a central axis of the second chip segment.

12. A tape head module, comprising:

a first chip segment;

a second chip segment, the second chip segment being congruent with the first chip segment;

a first element array disposed on the first chip segment, the first element array comprising a first plurality of data elements; and a second element array disposed adjacent to the first element array, the second element array comprising a second plurality of data elements, wherein one of the first element array or the second element array is off-center from a central axis of the first chip segment, wherein the first and second element arrays are aligned on a same longitudinal axis that is orthogonal to a direction of tape movement, wherein the second chip segment has a length substantially equal to a distance the first element array and the second element array are shifted from a centerline of the tape head module.

13. The tape head module of claim 12, wherein one of the first element array or the second element array is centered upon the central axis of the first chip segment.

14. The tape head module of claim 12, wherein the first chip segment has a greater length than the second chip segment, and wherein the first chip segment and the second chip segment were formed from a same rowbar.

15. The tape head module of claim 12, wherein the first chip segment and the second chip segment are joined together in a data element direction.

16. The tape head module of claim 12, further comprising a u-beam, wherein the first and second chip segments and the first and second element arrays are disposed on the u-beam, and wherein the first chip segment and the second chip segment are joined together in a data element direction.

17. The tape head module of claim 12, further comprising:

a third element array disposed on the second chip segment; and a fourth element array disposed on the second chip segment, wherein one of the third element array or the fourth element array is centered upon a central axis of the second chip segment.

18. The tape head module of claim 17, wherein the first, second, third, and fourth element arrays each individually comprises one or more servo elements and at least 32 write heads or at least 32 read heads.

19. The tape head module of claim 17, wherein the third element array is centered upon the central axis of the second chip segment, and wherein the fourth element array is off-center from the central axis of the second chip segment.

20. A tape drive comprising the tape head module of claim 12.

* * * * *